United States Patent
Dethmers

(10) Patent No.: US 8,322,584 B2
(45) Date of Patent: Dec. 4, 2012

(54) SUPPORT FOR COOLING A CONTAINER

(76) Inventor: Jonathan M. Dethmers, Reno, NV (US)

( * ) Notice: Subject to any disclaimer, the term of this patent is extended or adjusted under 35 U.S.C. 154(b) by 262 days.

(21) Appl. No.: 12/656,195

(22) Filed: Jan. 20, 2010

(65) Prior Publication Data
US 2010/0193556 A1    Aug. 5, 2010

Related U.S. Application Data

(60) Provisional application No. 61/202,202, filed on Feb. 5, 2009.

(51) Int. Cl.
*A45F 5/00* (2006.01)
*A45F 3/00* (2006.01)
*A45C 1/04* (2006.01)
*B60R 7/06* (2006.01)
*B60R 7/00* (2006.01)

(52) U.S. Cl. ........ 224/544; 224/268; 224/269; 224/666; 224/667; 224/668; 224/483; 224/278

(58) Field of Classification Search .......... 224/544, 224/268, 269, 666, 667, 668, 483, 278, 148.4, 224/148.7, 547, 829; 248/311.2, 690; 220/481
See application file for complete search history.

(56) References Cited

U.S. PATENT DOCUMENTS

| | | | |
|---|---|---|---|
| 4,098,421 A | 7/1978 | Foster | |
| D271,061 S * | 10/1983 | Zimmerman | ........... D3/229 |
| 4,562,620 A * | 1/1986 | Oliver, Jr. | ........... 24/163 K |
| 4,567,655 A | 2/1986 | Jacobs | |
| D283,076 S * | 3/1986 | States, Jr. | ........... D3/229 |
| D291,389 S * | 8/1987 | Crymes | ........... D3/229 |
| 4,852,843 A * | 8/1989 | Chandler | ........... 248/311.2 |
| 5,081,709 A * | 1/1992 | Benyo et al. | ........... 455/348 |
| 5,489,078 A * | 2/1996 | Risley | ........... 248/231.81 |
| 5,593,124 A * | 1/1997 | Wang | ........... 248/231.81 |
| D387,897 S * | 12/1997 | Yorke et al. | ........... D3/215 |
| 5,752,599 A | 5/1998 | Veltman | |
| 5,979,724 A * | 11/1999 | Loewenthal et al. | ........... 224/483 |
| 6,560,983 B1 * | 5/2003 | Schimmeyer | ........... 62/244 |
| D483,939 S * | 12/2003 | Kountz et al. | ........... D3/215 |
| 6,905,034 B2 * | 6/2005 | Jones | ........... 211/85.18 |
| D541,176 S | 4/2007 | Bried | |
| D548,957 S * | 8/2007 | Lowe | ........... D3/215 |

(Continued)

FOREIGN PATENT DOCUMENTS
GB    2147875 A    9/1984

*Primary Examiner* — Nathan J Newhouse
*Assistant Examiner* — Lester L Vanterpool
(74) *Attorney, Agent, or Firm* — Richard C. Litman

(57) ABSTRACT

The support for cooling a container is a portable holder for a container of chewing tobacco that can be releasably attached to a vehicle air conditioner vent. The support includes a substantially circular front wall having at least one front rib formed on an inner face thereof. A semi-cylindrical sidewall extends peripherally from the inner face of the front wall, and at least one side rib is formed on an inner face thereof. A rear strap or wall extends across the sidewall, forming a pocket for holding the container. The rear wall is adapted for releasable attachment to the vent. In use, the at least one front rib and the at least one side rib space the container apart from the respective inner faces of the front wall and the sidewall to permit cool air to circulate around the container.

3 Claims, 2 Drawing Sheets

U.S. PATENT DOCUMENTS

| | | | |
|---|---|---|---|
| 7,302,715 B1 * | 12/2007 | Finell | 4/559 |
| D595,955 S * | 7/2009 | Collins | D3/215 |
| D595,956 S * | 7/2009 | Collins | D3/215 |
| D597,300 S * | 8/2009 | Collins | D3/215 |
| D597,737 S * | 8/2009 | Collins | D3/215 |
| D600,006 S * | 9/2009 | Lau | D3/215 |
| 7,753,256 B2 * | 7/2010 | Sultana | 232/4 R |
| 7,766,294 B2 * | 8/2010 | Schimmeyer | 248/311.2 |
| 2002/0175195 A1 * | 11/2002 | Cole | 224/269 |
| 2003/0106917 A1 * | 6/2003 | Shetler et al. | 224/197 |
| 2005/0045006 A1 | 3/2005 | Addington et al. | |
| 2005/0173272 A1 | 8/2005 | Lemmons, IV | |
| 2006/0060480 A1 | 3/2006 | Budd | |
| 2007/0277299 A1 * | 12/2007 | Kroon | 4/259 |
| 2008/0178623 A1 * | 7/2008 | Cunningham | 62/244 |
| 2008/0210726 A1 * | 9/2008 | Josephs | 224/483 |

\* cited by examiner

SUPPORT FOR COOLING A CONTAINER

CROSS-REFERENCE TO RELATED APPLICATION

This application claims the benefit of U.S. Provisional Patent Application Ser. No. 61/202,202, filed Feb. 5, 2009.

BACKGROUND OF THE INVENTION

1. Field of the Invention

The present invention relates to portable supports for containers and to aftermarket holders for automobiles, boats, and the like, and particularly to a support for cooling a container that provides a holder for a container of chewing tobacco, smokeless tobacco or the like, that can be clipped or otherwise releasably mounting to a vehicle air conditioner vent or the like.

2. Description of the Related Art

Chewing tobacco (also known as chew) refers to a form of smokeless tobacco furnished as long strands of whole or very coarsely shredded leaves, which is consumed by placing a portion (typically referred to as a cud, plug or chaw) between the cheek and gum or teeth and chewing. Unlike dipping tobacco, chewing tobacco is not ground and must be mechanically crushed with the teeth to release flavor and nicotine.

A variety of different types of chewing tobacco are commercially available, including loose leaf tobacco, plug tobacco, twist tobacco and tobacco bits. Loose leaf tobacco is sweetened and packaged loose in aluminum lined pouches. The chewer simply takes a portion directly from the pouch. Plug tobacco is press-formed into sheets with the aid of a little syrup, typically in the form of molasses, which helps to maintain form as well as to sweeten the tobacco. The sheets are then cut into individual plugs, wrapped with fine tobacco and then packaged. Individual servings must be cut or bitten directly from the plug. Twist tobacco is spun and rolled into large rope-like strands and then twisted into a knot. The final product is much lower in moisture than plug or loose leaf, and historic varieties could be smoked in a pipe as well as chewed. Tobacco bits are formed by rolling sweetened and, typically, flavored tobacco into small pieces, which are then consumed individually. These are typically packaged in small cylindrical tins.

It is often desirable for the user to cool or refrigerate tobacco bits prior to insertion into the user's mouth. In addition to the sensation of the cooled chewing tobacco, refrigeration thereof minimizes the formation of nitrosamines therein, which are known carcinogens. As tins of tobacco bits are commonly carried by the users, often in pockets, where the tins can be heated by body heat, it would be desirable to provide a holder for such tins that allows for the portable cooling thereof. Thus, a support for cooling a container solving the aforementioned problems is desired.

SUMMARY OF THE INVENTION

The support for cooling a container is a portable holder for a container of chewing tobacco, smokeless tobacco, or the like that can be clipped or otherwise releasably mounted on the vent of a vehicle air conditioner or other cooling source. The support includes a substantially semicircular wall dimensioned to substantially correspond to the circular base of a typical flat, cylindrical tin of chewing tobacco. At least one front rib is formed on an inner face of the wall.

At least one sidewall is mounted peripherally to the inner face of the front wall, and at least one side rib is formed on an inner face of the at least one sidewall. Preferably, the at least one sidewall is formed as a substantially semi-circular wall extending peripherally from a lower portion of the perimeter of the front wall. A rear wall, or a rear retainer strap, is attached to the at least one sidewall, and is positioned substantially parallel to the front wall, extending substantially diametrically across the sidewall. At least one opening or slot is formed in the rear wall, and an open space is defined between a lower edge of the rear wall and the lower peripheral edge of the sidewall.

At least one clip is further provided, the at least one clip having opposed open and closed ends. The closed end of the clip has an engaging member formed thereon, the engaging member being adapted for removable insertion through the at least one opening formed in the rear wall or strap. The open end of the clip is adapted for attachment to a vehicle's air conditioning vent, or other cooling source.

The front wall, the sidewall and the rear wall define a semi-cylindrical pocket for receiving the container. In use, the at least one front rib and the at least one side rib space the container apart from the respective inner faces of the front wall and the sidewall to permit cold air from the air conditioner to circulate across the base and around the sidewall of the cylindrical tobacco container. The at least one clip is attached to the rear wall by removable insertion of the engaging member within the at least one opening, and the open end is clipped to the air conditioning vent to cool the container. Cool air generated by the air conditioner passes around the container through the spaces defined by the front and side ribs, and through the open space formed between the lower edge of the rear wall and the lower peripheral edge of the sidewall.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
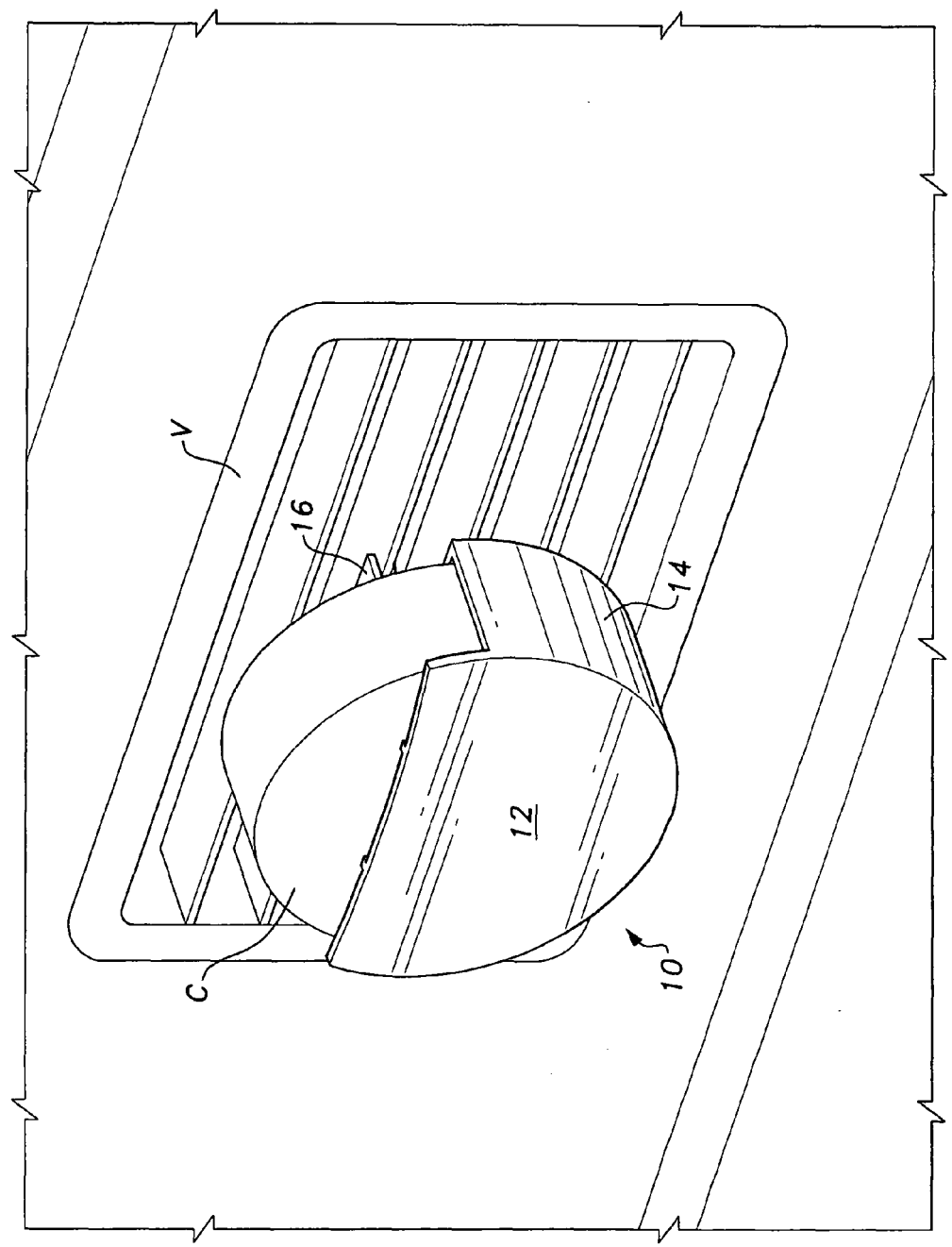
FIG. 1 is an environmental, perspective view of a support for cooling a container according to the present invention.
Figure 2:
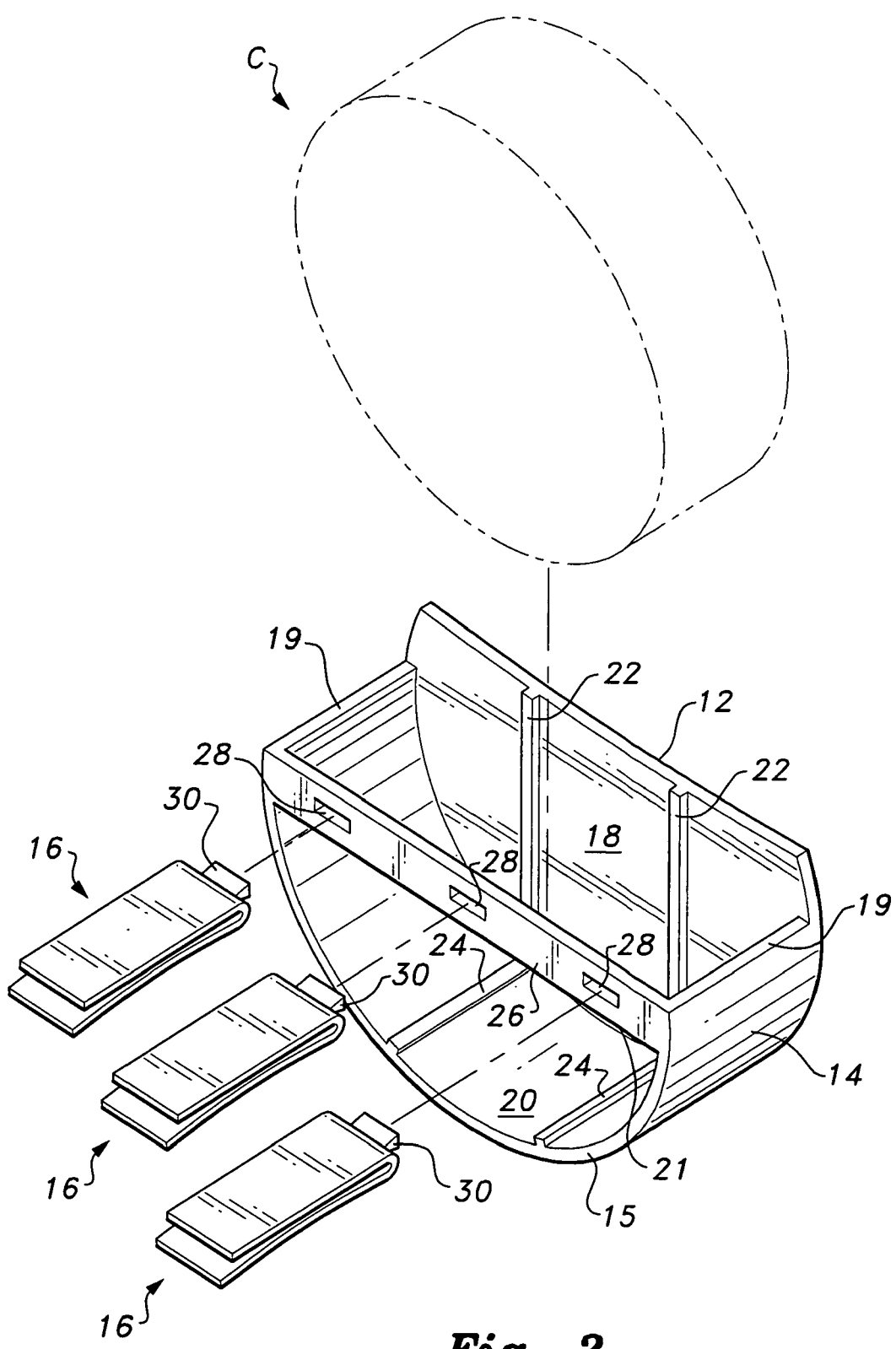
FIG. 2 is a partially exploded perspective view of the support for cooling a container according to the present invention as seen from the rear.

Referring now to FIGS. 1 and 2, there is shown a support 10 for cooling a container C. The support for cooling a container is a portable holder for a container of chewing tobacco, smokeless tobacco or the like. The support 10 is adaptable for attachment to the vent V of a vehicle air conditioner or the like. In FIG. 1, container C is shown as a conventional flat, cylindrical tin of chewing tobacco or smokeless tobacco. It should be understood that container C is shown for exemplary purposes only. The shape and dimensions of support 10 are designed to match the shape and dimensions of the container C. Thus, it should be understood that the dimensions and shape of support 10 shown in the drawings are for exemplary purposes only, and are dependent upon the particular size and shape of the container C. Similarly, it should be understood that support 10 may be fixed to any suitable support surface, and vent V is also shown for exemplary purposes only.

The support 10 includes a front wall 12 that is substantially semicircular or, more precisely, a substantially semicircular segment of a circle. The arc defined by front wall 12 may be greater than 180°, so that the front wall has a height greater than one-half the height of the container C when the container C is standing on edge. Front wall 12 is dimensioned to substantially correspond to the circular shape and dimensions of a typical flat, cylindrical tin of chewing tobacco, such as exemplary container C. As best shown in FIG. 2, at least one front rib 22 is formed on an inner face 18 of front wall 12. Although shown as a pair of front ribs 22, it should be understood that any suitable number of ribs 22 may be formed thereon.

At least one sidewall 14 extends peripherally from the inner face 18 of the front wall 12, and at least one side rib 24 is formed on an inner face 20 of the at least one sidewall 14. Although shown as a pair of side ribs 24, it should be understood that any suitable number of ribs 24 may be formed thereon. Preferably, as shown, the at least one sidewall 14 is formed as a substantially semi-cylindrical wall joined peripherally to a lower portion of the front wall 12, and corresponds to the shape and dimensions of container C.

Additionally, a rear strap or rear wall 26 is attached to the sidewall 14, and is positioned substantially parallel to the front wall 12, extending substantially horizontally and diametrically across the sidewall 14. As shown in FIG. 2, the rear wall 26 preferably extends across the upper edges 19 of sidewall 14 so that an open space is defined between a lower edge 21 of the rear wall 26 and the lower peripheral edge 15 of the sidewall 14. Additionally, at least one slot or opening 28 is formed in the rear wall 26. Although three such slots 28 are shown in FIG. 2, it should be understood that any desired number of slots may be formed through rear wall 26.

At least one clip 16 is provided, with the at least one clip 16 having opposed open and closed ends. The closed end of the clip 16 has an engaging tab or member 30 formed thereon, with the engaging member 30 being adapted for removable insertion through the at least one opening 28 formed through the rear wall 26. In FIG. 2, three openings 28 and three corresponding clips 16 are shown, though it should be understood that any suitable number of clips may be used. The open end of the at least one clip 16 is adapted for releasable attachment to an external support, such as the vehicular air conditioning vent V. Alternatively, it should be understood that any suitable releasable fastener may be used for releasable attachment to the support surface, such as hooks, adhesive pads, etc., and the releasable fastener may itself be either releasably attached to the rear strap or wall 26 or may be permanently fixed to the rear strap or wall 26 or formed integrally therewith.

The front wall 12, the sidewall 14 and the rear wall 26 define a pocket for receiving the container C. In use, the at least one front rib 22 and the at least one side rib 24 space the container C apart from the respective inner faces 18, 20 of the front wall 12 and the sidewall 14 to permit cool air from the air conditioner to circulate across the base and around the sidewall of the container C. The at least one clip 16 is secured to the rear wall 26 via removable insertion of the engaging member 30 within the at least one opening 28, and the open end of the at least one clip 16 is clipped to the air conditioning vent V to cool the container. Preferably, the support 10 is formed from a thermally conductive material. Cool air generated by the air conditioner passes around the container C, through the spaces defined by the front and side ribs 22, 24, and through the open space formed between the lower edge 21 of the rear wall 26 and the lower peripheral edge 15 of the sidewall 14.

It is to be understood that the present invention is not limited to the embodiments described above, but encompasses any and all embodiments within the scope of the following claims.

I claim:

1. A support for cooling a container, comprising:
   a front wall, the front wall being at least a segment of a circle defining a periphery, an outer face and an inner face;
   at least one front rib formed on the inner face of the front wall;
   an arcuate sidewall extending from the periphery of the front wall, the sidewall defining an outer face, an inner face, and a periphery;
   at least one side rib formed on the inner face of the sidewall;
   a rear strap extending horizontally across the periphery of the sidewall, the rear strap being fixedly attached to the periphery of the sidewall and being substantially parallel to the front wall, the strap defining an open space between the strap and the periphery of the sidewall, the rear strap having at least one slot formed therein, the front wall, the sidewall, and the rear strap defining a pocket adapted for holding a container, the at least one front rib and the at least one side rib being adapted for spacing the container apart from the respective inner faces of the front wall and the sidewall to permit cooling air to circulate around the container; and
   at least one clip attached to the rear strap, the at least one clip has a forward engaging member being releasably received within the at least one slot in the rear strap, wherein the clip is disposable substantially perpendicular to the rear strap.

2. The support for cooling a container as recited in claim 1, wherein said sidewall is substantially semicylindrical.

3. A support for cooling a container, comprising:
   a front wall, the front wall being at least a segment of a circle defining a periphery, an outer face and an inner face;
   at least one front rib formed on the inner face of the front wall;
   an arcuate sidewall extending from the periphery of the front wall, the sidewall defining an outer face, an inner face, and a periphery;
   at least one side rib formed on the inner face of the sidewall;
   a rear strap extending horizontally across the periphery of the sidewall, the rear strap being fixedly attached to the periphery of the sidewall and being substantially parallel to the front wall, the strap defining an open space between the strap and the periphery of the sidewall, the front wall, the sidewall, and the rear strap defining a pocket adapted for holding a container, the at least one front rib and the at least one side rib being adapted for spacing the container apart from the respective inner faces of the front wall and the sidewall to permit cooling air to circulate around the container; and
   at least one clip attached to the rear strap and extends substantially perpendicular to the rear strap.

* * * * *